US011540084B2

United States Patent
Makkiya et al.

(10) Patent No.: US 11,540,084 B2
(45) Date of Patent: Dec. 27, 2022

(54) DYNAMIC GEOFENCING HYSTERESIS

(71) Applicant: Ford Global Technologies, LLC, Dearborn, MI (US)

(72) Inventors: Hussam Makkiya, Dearborn, MI (US); Nunzio DeCia, Northville, MI (US); Elena Ilieva, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/206,605

(22) Filed: Mar. 19, 2021

(65) Prior Publication Data

US 2022/0303719 A1 Sep. 22, 2022

(51) Int. Cl.
*G08G 1/127* (2006.01)
*H04W 4/021* (2018.01)
*H04W 4/029* (2018.01)
*H04W 4/44* (2018.01)

(52) U.S. Cl.
CPC .......... *H04W 4/022* (2013.01); *H04W 4/029* (2018.02); *H04W 4/44* (2018.02)

(58) Field of Classification Search
USPC ... 340/989–995.1, 995.13, 427–429, 426.15, 340/426.22–426.25, 449, 463
See application file for complete search history.

(56) References Cited

U.S. PATENT DOCUMENTS

| 7,164,986 | B2 * | 1/2007 | Humphries | ............. | B60R 25/00 340/426.22 |
| 9,167,381 | B2 * | 10/2015 | McDonald | .............. | H04L 67/18 |
| 9,654,924 | B2 * | 5/2017 | Jernigan | ................. | G01S 19/13 |
| 2008/0258890 | A1 * | 10/2008 | Follmer | ................. | G08G 1/052 340/439 |
| 2013/0261961 | A1 * | 10/2013 | Cardoso, Jr. | ........... | G01C 21/32 701/467 |
| 2014/0279123 | A1 * | 9/2014 | Harkey | .............. | G06Q 30/0619 705/26.1 |
| 2020/0132482 | A1 | 4/2020 | Beaurepaire et al. | | |
| 2020/0258018 | A1 * | 8/2020 | Brady | ...................... | H04W 4/40 |
| 2021/0039603 | A1 * | 2/2021 | Moeller | ................. | G06Q 20/12 |
| 2021/0099828 | A1 * | 4/2021 | Hanna | .................... | H04W 4/029 |

\* cited by examiner

*Primary Examiner* — Daniel Previl
(74) *Attorney, Agent, or Firm* — Joseph Zane; Brooks Kushman, P.C.

(57) ABSTRACT

A vehicle geofence system may include a vehicle location detection device configured to provide vehicle location data for a vehicle, a memory configured to maintain geofence data, and a processor programmed to receive the vehicle location data, compare a vehicle location as indicated by the vehicle location data to the geofence data, in response to determining that the vehicle has crossed a geofence, present an inquiry, to a user, requesting feedback as to the accuracy of the geofence crossing, receive user feedback to the inquiry, and provide the user feedback to a server external of the vehicle.

16 Claims, 7 Drawing Sheets

DYNAMIC GEOFENCING HYSTERESIS

TECHNICAL FIELD

Disclosed herein are systems and methods for dynamic geofencing hysteresis.

BACKGROUND

Vehicle systems often use vehicle location data and geofence data to issue alerts, notify third parties of a vehicle's arrival, etc. Such geofences, which create virtual boundaries for a specific geographic area, may be established by shopping centers, municipalities, as well as the driver. However, inaccuracies with reported vehicle locations may create false alerts or information, leading to redundant or inaccurate reporting of the vehicle location.

SUMMARY

A vehicle geofence system may include a vehicle location detection device configured to provide vehicle location data for a vehicle, a memory configured to maintain geofence data, and a processor programmed to receive the vehicle location data, compare a vehicle location as indicated by the vehicle location data to the geofence data, in response to determining that the vehicle has crossed a geofence, present an inquiry, to a user, requesting feedback as to the accuracy of the geofence crossing, receive user feedback to the inquiry, and provide the user feedback to a server external of the vehicle.

A method for a vehicle geofence system may include receiving vehicle location data for a vehicle, comparing a vehicle location as indicated by the vehicle location data to geofence data stored in a memory, presenting, in response to determining that the vehicle has crossed a geofence, an inquiry, to a user, requesting feedback as to the accuracy of the geofence crossing, receiving user feedback to the inquiry, and providing the user feedback to a server external of the vehicle.

A vehicle geofence system may include a vehicle location detection device configured to provide vehicle location data for a vehicle, a memory configured to maintain geofence data, a vehicle display configured to present information and receive user feedback, and a processor programmed to: in response to determining that the vehicle has crossed a geofence based on the location data, instruct the display to present an inquiry regarding the accuracy of the geofence crossing, receive, at the display, the user feedback to the inquiry, and provide the user feedback to a server external of the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a vehicle geofence system configured to present alerts to users and third parties when a vehicle enters and exits a geofence. Vehicle systems often use vehicle location data and geofence data to issue alerts, notify third parties of a vehicle's arrival. However, vehicle location inaccuracies may lead to redundant or erroneous notifications. Global positioning system (GPS) inaccuracy can be measured by the vehicle's global system for mobile communications (GSM) chipset, and then reported as a value known as 3D estimation error. The 3D estimation error may be maintained by the vehicle, as well as an external server. When determining whether to alert the driver to the crossing of a geofence, the vehicle may perform exit-only hysteresis, where the vehicle is considered to enter the geofence (e.g., a parking spot) ignoring the estimation error, but using the estimation error before indicating the vehicle has exited the geofence. Additionally, the driver or third party may be informed of low accuracy situations. The driver may be prompted with an inquiry to provide feedback in real-time via a user interface to indicate whether a vehicle calculated fence crossing entry/exit events, after applying hysteresis, was valid. This may aid in allowing the server to aggregate data across subscribing vehicles to increase the accuracy of geofences and alerts.

Figure 1:
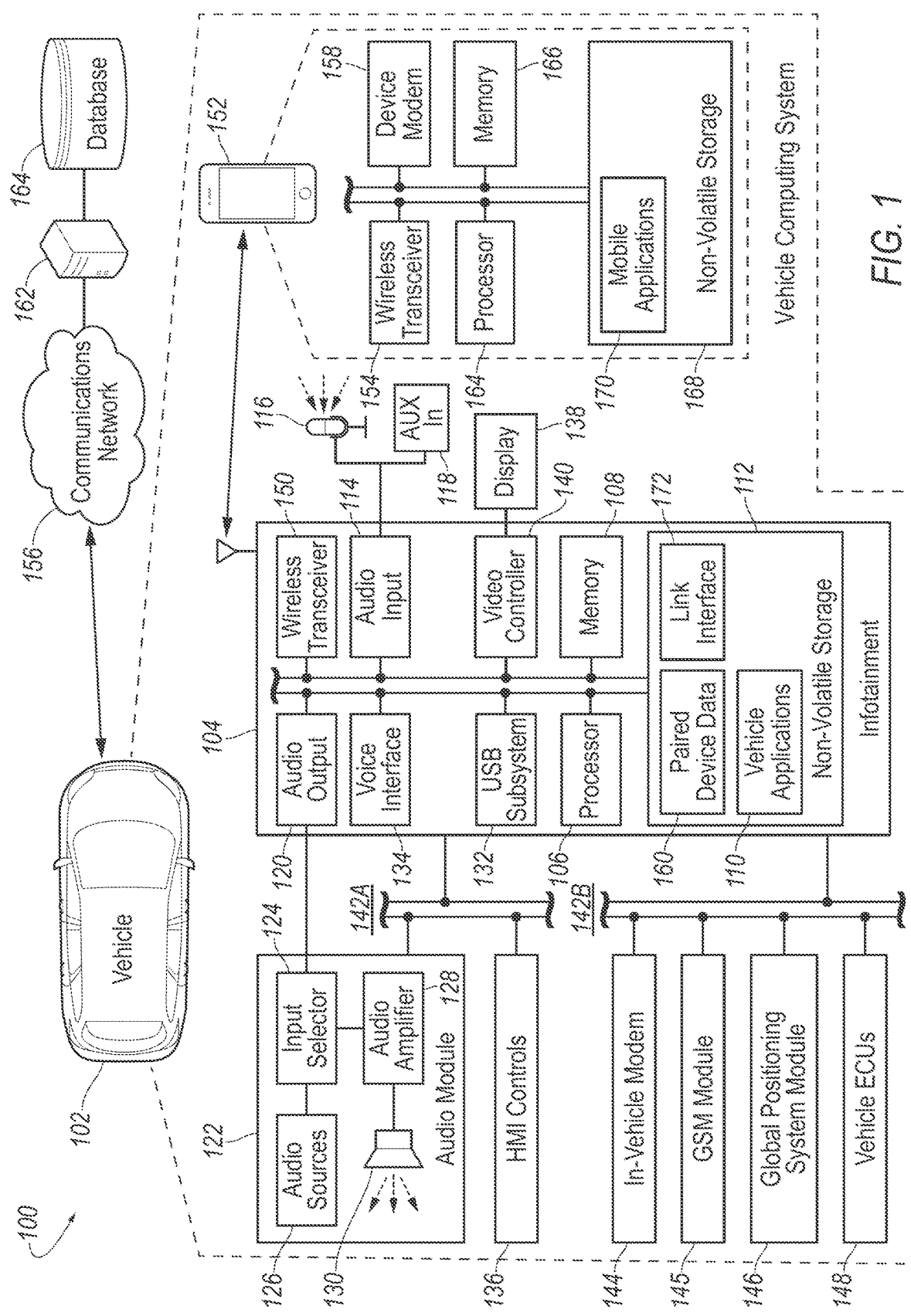
FIG. 1 illustrates an example diagram including a vehicle configured to access telematics servers and a mobile device.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The infotainment system 104 may include one or more processors 106 configured to perform instructions, commands and other routines in support of the processes described herein. For instance, the infotainment system 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable storage medium 112 (also referred to as a processor-readable medium 112, memory 112, or storage) includes any non-transitory medium (e.g., a tangible medium) that participates in providing instructions or other data that may be read by the processor 106 of the infotainment system 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/structured query language (SQL).

The infotainment system 104 may be provided with various features allowing the vehicle occupants to interface with the infotainment system 104. For example, the infotainment system 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The infotainment system 104 may also provide one or more audio outputs 120 to an input of an audio module 122 having audio playback functionality. In other examples, the infotainment system 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the infotainment system 104, such as audio content generated by the infotainment system 104, audio content decoded from flash memory drives connected to a universal serial bus (USB) subsystem 132 of the infotainment system 104, and audio content passed through the infotainment system 104 from the auxiliary audio input 118.

The infotainment system 104 may utilize a voice interface 134 to provide a hands-free interface to the infotainment system 104. The voice interface 134 may support speech recognition from audio received via the microphone 116 according to grammar associated with available commands, and voice prompt generation for output via the audio module 122. The voice interface 134 may utilize probabilistic voice recognition techniques using the grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the infotainment system 104 and another audio source 126 is selected for playback.

The infotainment system 104 may also receive input from human-machine interface (HMI) controls 136 configured to provide for occupant interaction with the vehicle 102. For instance, the infotainment system 104 may interface with one or more buttons or other HMI controls configured to invoke functions on the infotainment system 104 (e.g., steering wheel audio buttons, a push-to-talk button, instrument panel controls, etc.). The infotainment system 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a view screen without touch input capabilities.

The infotainment system 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the infotainment system 104 to communicate with other vehicle 102 systems, such as a vehicle modem 144 (which may not be present in some configurations), a GPS module 146 and a GSM module 145 configured to provide current vehicle 102 location and heading information, and various vehicle electronic control units (ECUs) 148 configured to corporate with the infotainment system 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the infotainment system 104 over a first in-vehicle network 142-A, and the vehicle modem 144, GPS module 146, and vehicle ECUs 148 may communicate with the infotainment system 104 over a second in-vehicle network 142-B. In other examples, the infotainment system 104 may be connected to more or fewer in-vehicle networks 142. Additionally or alternately, one or more HMI controls 136 or other components may be connected to the infotainment system 104 via different in-vehicle networks 142 than shown, or directly without connection to an in-vehicle network 142.

The infotainment system 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the infotainment system 104. In many examples, the infotainment system 104 may include a wireless transceiver 150 (e.g., a BLUETOOTH module, a ZIGBEE transceiver, a Wi-Fi transceiver, an IrDA transceiver, a radio frequency identification (RFID) transceiver, etc.) configured to communicate with a compatible wireless transceiver 154 of the mobile device 152. Additionally or alternately, the infotainment system 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the infotainment system 104 may be identified by the infotainment system 104 according to paired device data 160 maintained in the storage medium 112. The paired device data 160 may indicate, for example, the unique device identifiers of mobile devices 152 previously paired with the infotainment system 104 of the vehicle 102, secret information shared between the paired device and the infotainment system 104 such as link keys, and/or personal identification numbers (PINs), and most recently used or device priority information, such that the infotainment system 104 may automatically reconnect to the mobile devices 152 matching data in the paired device data 160 without user intervention.

When a mobile device 152 that supports network connectivity is connected to the infotainment system 104, the mobile device 152 may allow the infotainment system 104 to use the network connectivity of the device modem 158 to communicate over the communications network 156 with the remote telematics server 162 or other remote computing device. In one example, the infotainment system 104 may utilize a data-over-voice plan or data plan of the mobile device 152 to communicate information between the infotainment system 104 and the communications network 156. Additionally or alternatively, the infotainment system 104 may utilize the vehicle modem 144 to communicate information between the infotainment system 104 and the communications network 156, without use of the communications facilities of the mobile device 152.

Similar to the infotainment system 104, the mobile device 152 may include one or more processors 164 configured to execute instructions of mobile applications loaded to a memory 166 of the mobile device 152 from storage medium 112 of the mobile device 152. In some examples, the mobile applications may be configured to communicate with the infotainment system 104 via the wireless transceiver 154 and with the remote telematics server 162 or other network services via the device modem 158. The infotainment system 104 may also include a device link interface 172 to facilitate the integration of functionality of the mobile applications into the grammar of commands available via the voice interface 134. The device link interface 172 may also provide the mobile applications with access to vehicle functions and information available to the infotainment system 104 via the in-vehicle networks 142. An example of a device link interface 172 may be the SYNC APPLINK component of the SYNC system provided by The Ford Motor Company of Dearborn, Mich.

The vehicle applications 110 may include a geofence system configured to determine a vehicle location from at least one of the GSM module 145 or GPS module 146. The GPS module 146 may indicate a vehicle location and the GSM module 145 may generate a 3D estimation error for the GPS location. This vehicle location data may be used by the processor 106 to determine if and when a vehicle 102 has crossed a geofence.

Figure 2:
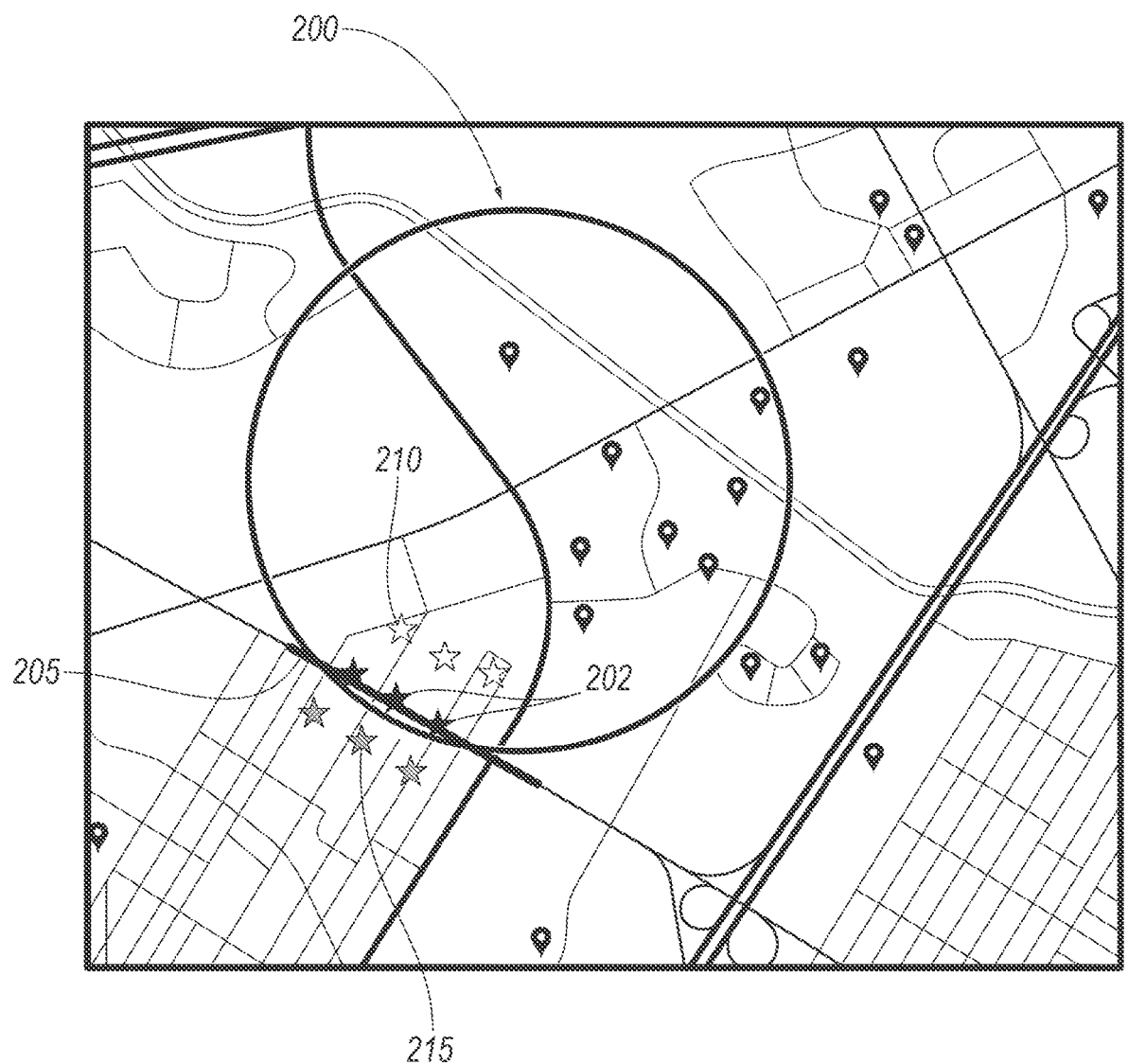
FIG. 2 illustrates an example map image of a geofence with vehicle locations within and outside of the geofence.

FIG. 2 illustrates an example map image of a geofence 200. A geofence may be a virtual perimeter defining a geographic area. In the example in FIG. 2, the geofence may be circular in shape and form a radius around a certain geographic location. In other examples, the geofence 200 may be any shape, including oblong, quadrilateral, etc. Geofences may be established by a client such as a retail establishment, restaurant, etc., via a mobile app, web portal, etc. The geofence 200 may be established for any number of reasons such as detecting when a vehicle enters or leaves a specific geographic area. This may for purposes of detecting when a vehicle arrives at a certain location, for example, for curb-side pickup or parking spot entry. Geofencing may also be used for theft detection when a vehicle is detected leaving a geofence, among other uses.

The geofence 200 may be defined through an address search, point of interest (POI), pin drop on a map, natural boundary, defined parking spot, etc. In many cases, geofences are stored onboard via the vehicle telematics, in a memory such as memory 112, illustrated in FIG. 1. This allows the vehicle 102 to more efficiently process location data without latency delays often created by communicating with the communications network 156.

A vehicle location, as explained above, may be determined based on vehicle location data provided by the GPS module 146 and GSM module 145 of the vehicle 102. The geofence application within the vehicle 102 may process the vehicle location against the geofences. In the event a geofence boundary is crossed, data may be transmitted regarding the crossing, either upon entering or leaving the geofence 200. The vehicle 102 may transmit the data to the communications network 156. The data may indicate an entry or exit of the specific vehicle. In this example, the cloud may manage geofence management services.

Additionally, and as explained above, the GSM module 145 may be used to determine a 3D estimation error of the GPS signal. The 3D estimation error may be used to generate a radius about the vehicle to determine possible vehicle locations with an included error.

Oftentimes when vehicles are traveling along a route, the vehicle may border a geofence. The geofence system within the vehicle 102 may provide an alert to the driver that the drive has entered the geofence 200. Similarly, the vehicle 102 may provide an alert to the driver when the vehicle 102 exits the geofence. The alerts may be visual, through the vehicle display 138 or mobile device displays, audible through the vehicle or mobile device audio module 122, or haptic alerts. The alerts may be a combination of alerts.

The location of the vehicle 102 may be determined by the GPS module 146. However, the GPS module 146 may be inaccurate to a certain degree. For example, the GPS module 146 may be inaccurate by up to 20 meters. While such inaccuracies may not affect traditional navigation and routing systems on the vehicle, the inaccuracies may affect geofencing comparisons. In the example shown in FIG. 2, a vehicle may be traveling along a route 205. A series of GPS locations 202 may be received along that route 205 indicating the location of the vehicle. However, in certain areas, times of the day, etc., such GPS locations may not be entirely accurate. In one example, the GPS location may include a first GPS location 210 that differs from the actual vehicle GPS location 202. The GPS location may include a second GPS location 215 that differs from the actual vehicle GPS location 202 as well. In this, the first and second GPS locations 210, 215 may represent the margin of error on the GPS module reading. That is, if the vehicle 102 is traveling along the route 205, GPS locations at +/−20 m may be received.

As the vehicle 102 approaches the outer perimeter of the geofence 200, the inaccuracies of the GPS locations (e.g., the illustrated first and second GPS locations 210, 215) may cause the vehicle 102 to move in and out of the geofence 200. With each crossing of the geofence 200, the vehicle 102 may issue alerts, indicating that the vehicle has entered and/or left the geofence 200. These alerts may be distracting and cumbersome to the driver of the vehicle 102.

Additionally, third parties may be confused by the vehicle's location with respect to the geofence 200. In the example of a third party being a retail establishment, the retail establishment may rely on notifications of the vehicle 102 entering or leaving the geofence 200 for purposes of curb-side delivery of items, drop offs, etc.

In order to decrease the number of false alerts due to GPS inaccuracies, the geofrence system may use various hysteresis approaches to prevent false alerts. In one example, GPS inaccuracies may be measured by the vehicle's GSM module 145, and then reported as a value known as 3D estimation error. This value may be continuously updated in real-time or near real-time to provide for dynamic geofence boundaries to further reduce false boundary crossing events. In the examples described herein, a map of 3D estimation error may be maintained by the server 162 instead of being solely stored on the vehicle 102 itself. This may allow the system to have all participating vehicles provide their respective 3D estimation error values to the server 162 periodically. This allows for more data aggregation service to build a database of possible hot spots where 3D estimation error is large enough to be prohibited for smaller geofences. This may typically occur in more densely populated areas.

This information may also be provided to a front-end client during geofence creation. For example, the client may be privy to the fact that the 3D estimation error in an area is large. The client may, for example, receive an alert such as "Warning: other users have reported vehicle less-than ideal location accuracy in this area, you may want to increase the size of the geofence to reduce errors." Thus, clients may receive guidance for creating appropriate fence sizes based on the vehicle's localization capabilities for a variety of environments where enough reported data is available.

The vehicle 102 may perform specific hysteresis for determining whether the vehicle 102 has crossed a geofence. In one example, the vehicle 102 may perform exit-only hysteresis, where the vehicle is considered to enter the geofence (e.g., a parking spot) ignoring the estimation error but uses the estimation error before indicating the vehicle has exited the geofence. Similar to clients being informed for the creation of geofences, drivers may also be informed of low accuracy errors.

Additionally, a user may provide feedback as to low vehicle location accuracy. In some examples, the vehicle 102 may issue an alert and subsequently ask the user whether the alert is accurate. For example, the display 138 may display text such as "Vehicle detected to be within a geofence, specifically at Target®, parking bay 6—Is this accurate?". The display 138 may present selection options such as "yes" or "no", for the user to select. The inquiry may also be presented audibly via the vehicle speakers 130, or through the mobile device 152. Responses to the inquiry may sent to the server 162 to generate the database of potential hot spots and inaccuracies for the server 162 to use. The vehicle 102 may also update its hysteresis based on the user feedback as well. Thus, the user feedback assists in improving and tuning the hysteresis algorithm and allow for further adaptive learning over time as the user confirms valid events and dismisses invalid events.

Figure 3A:
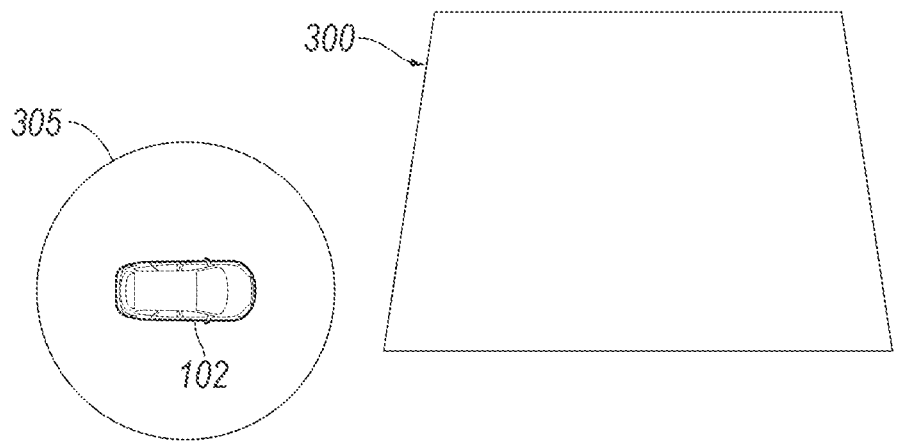
FIG. 3A illustrates an example diagram of a vehicle location determined to be outside of a geofence.

FIG. 3A illustrates an example diagram of the vehicle 102 being outside of a geofence 300. In this example, the vehicle 102 may be approaching the polygonal geofence 300. The server 162 may determine a 3D estimation error for the vehicle 102 and determine a potential vehicle location or radius based on the estimation error. In one example, the vehicle location inaccuracy may be +/−3 ft, forming a 3 ft radius 305 around the vehicle location. This may be determined by the location data including the GPS and GSM data. In this example, the server 162 may compare the geofence 300 with the reported location +/−3 ft.

Figure 3B:
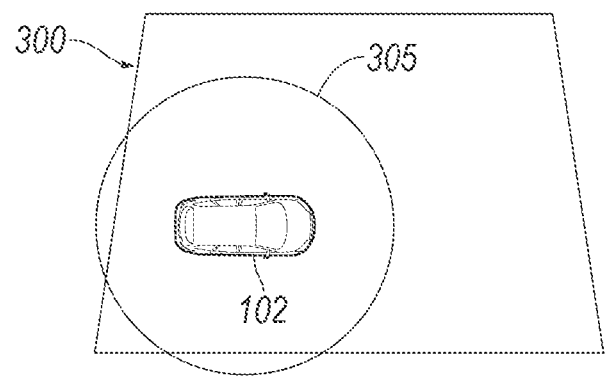
FIG. 3B illustrates an example diagram of a vehicle location determined to be at least partially within a geofence based on the vehicle hysteresis.

FIG. 3B illustrates an example diagram of the vehicle 102 being determined to be at least potentially within the geofence 300 based on the vehicle hysteresis. The vehicle hysteresis may adjust at both entry and exit of the vehicle 102 from the geofence 300. In some examples the hysteresis includes various adjustments to the reported vehicle location when estimating whether the vehicle is within a geofence or not. The hysteresis may include exit-only hysteresis. In this example, by using hysteresis to estimate the actual vehicle location, false or redundant alerts may be avoided.

Figure 3C:
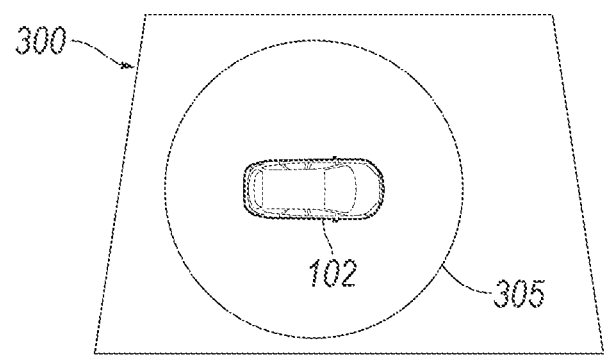
FIG. 3C illustrates an example diagram of a vehicle location determined to be at least potentially within a geofence based on the vehicle hysteresis.

FIG. 3C illustrates an example diagram of the vehicle 102 being determined to be within the geofence 300 based on the vehicle hysteresis.

Figure 4:
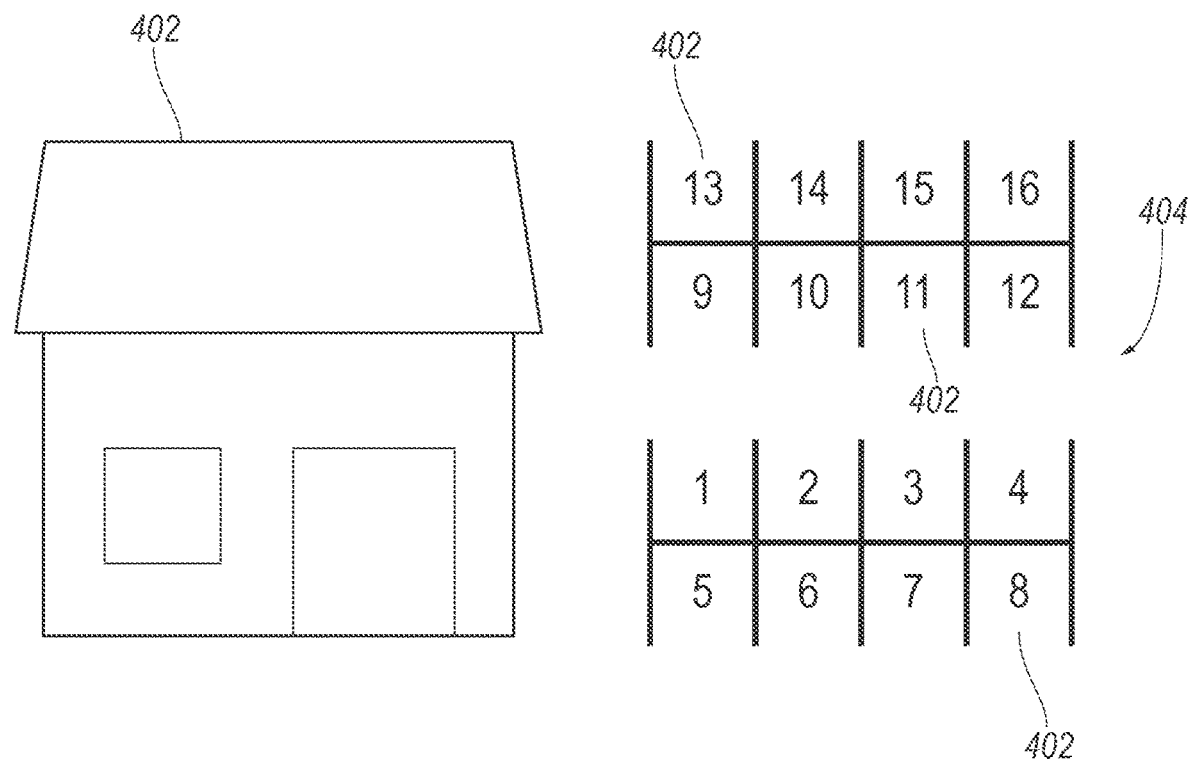
FIG. 4 illustrates an example schematic of a parking lot that uses geofences to determine parking locations.

FIG. 4 illustrates an example schematic of an example building 402 and an associated parking lot 404. The building 402 may be a store that participates in curb-side pick-up. The parking lot 404 may include parking spots 406 that are assigned a number. Each parking spot may outline a geofence in order to detect when a vehicle enters or leaves the parking spot 406. The building 402 may receive a notification or alert as to the entry of a vehicle 102 to a certain parking spot 406 so that goods may be delivered to the vehicle 102 upon the vehicle arriving at the store. However, often times the vehicle hysteresis may have an entry hysteresis geofence that is larger than the parking spot 406 in order to limit notifications of entry into the spot. To obviate this, exist hysteresis' can be used to block entry-exit-noise on these common driving conditions and support entry into a tight parking spot. Notably, exit hysteresis' may serve as a reasonable compromise between accuracy and small geofence sizes. In the example of FIG. 4, the aggregated estimated error may indicate that the fence size is small and may be prohibitive, but exit-only hysteresis may still allow for the functions to be executed.

Figure 5:
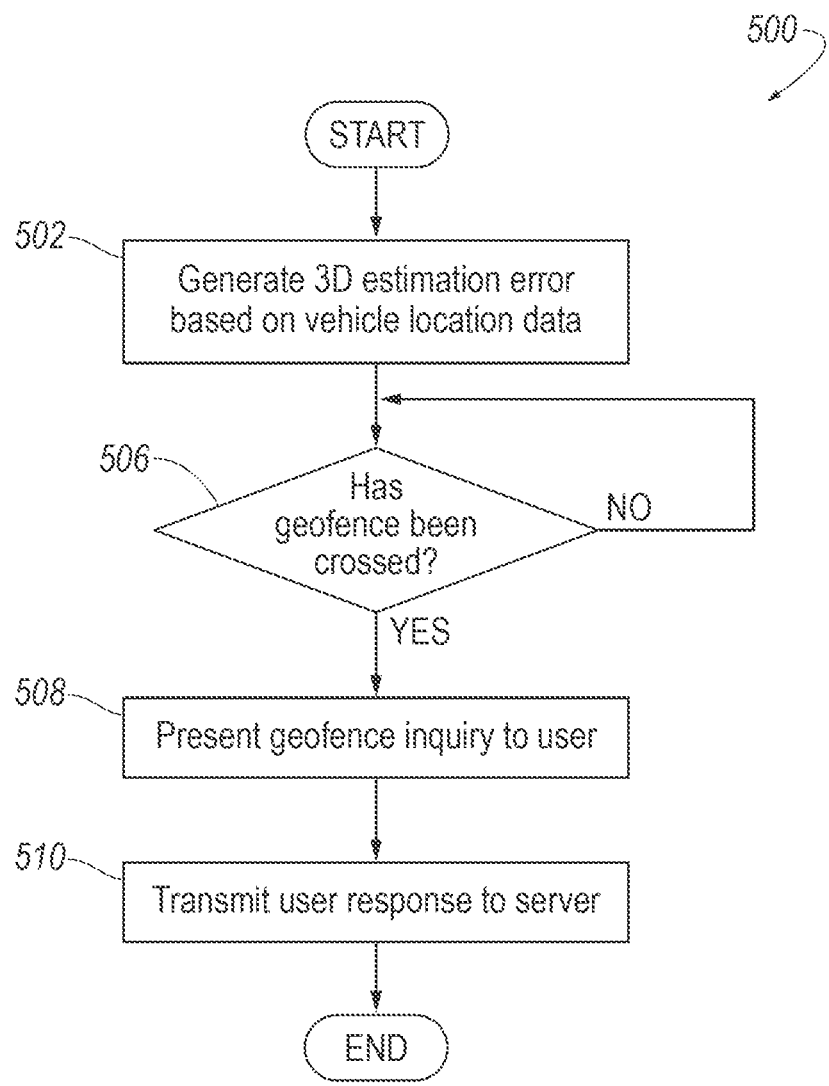
FIG. 5 illustrates an example process for the geofencing system.

FIG. 5 illustrates an example process 500 for the geofencing system to receive user feedback about certain geofences to increase hysteresis accuracy. The process 500 may begin at block 502 where the vehicle 102, specifically the processor 106, generates a 3D estimation error based on the GSM and GPS data of the vehicle. The vehicle 102 may transmit the 3D estimation error to the server 162. This may be done via communications network 156. The server 162, as explained above, may use this data to determine areas with higher error rates, and aggregate data from the subscribing vehicles.

At block 506, the vehicle 102 may determine whether a geofence boundary has been crossed. This may be accomplished by comparing geofence data with the 3D estimation error. If a geofence has been crossed, the process 500 proceeds to block 508. If not, the process 500 continues to wait for the reported vehicle location to enter or leave a geofence. The vehicle 102 may use various hysteresis to determine whether the geofence has been crossed, including exit-only hysteresis.

At block 508, in response to the vehicle 102 detecting and crossing a geofence, the vehicle 102 may provide an inquiry to the user regarding the accuracy of any geofence alerts. As explained above, the vehicle 102 may present the user with a questionnaire as to whether the geofence is accurate. The inquiry may include a question such as "Are you currently parked at parking spot #6." The inquiry may be audible or visual, and may be provided through vehicle 102 systems such as the display 138 or vehicle speakers 130. Additionally or alternatively, the inquiry may be presented via the mobile device 152.

At block 510, the vehicle may receive the user response to the inquiry and transmit the response to the server 162. The server 162 may use this response to aggregate data and provide updated hysteresis to the vehicle 102 for better refining of geofences, 3D estimation error, etc. The process 500 may then end.

Figure 6:
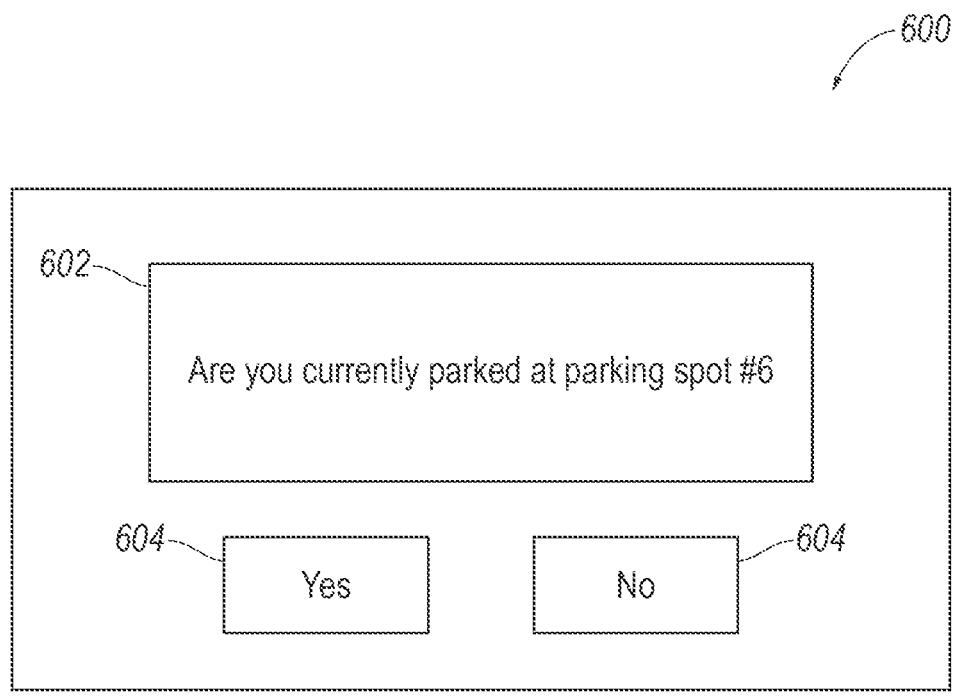
FIG. 6 illustrates an example user interface for the geofence system.

FIG. 6 illustrates an example user interface 600 presented an inquiry to the user. The inquiry may include a question or message 602 and selectable response options 604. The user may select one of the options 604 to indicate whether the geofence has been crossed. The options may include one option indicating that the geofence was crossed and thus the vehicle location is accurate, and another option indicating that the geofence was not crossed and thus the vehicle location is inaccurate. In some instances, the vehicle 102 may present an alert that the geofence has been crossed in addition to the inquiry.

Figure 7:
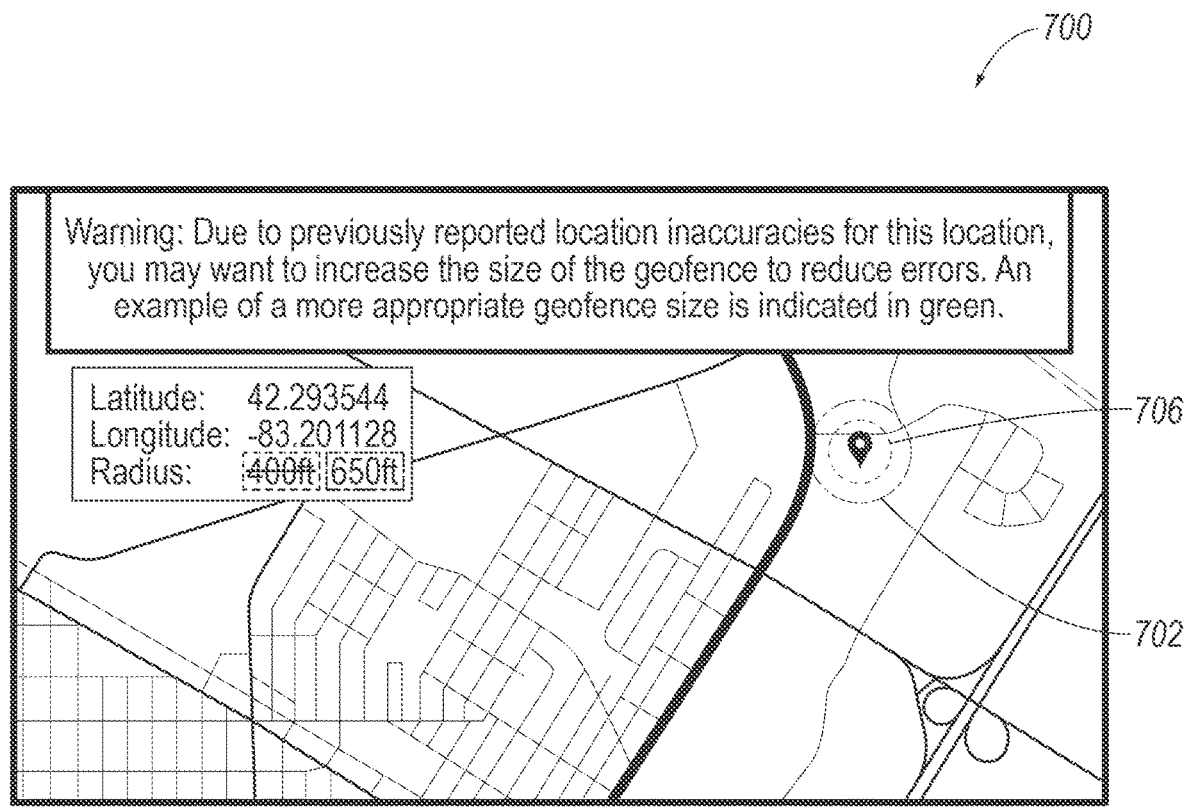
FIG. 7 illustrates an example user interface display providing a geofence alert.

FIG. 7 illustrates an example user interface screen 700 providing an geofence alert for when a user or customer may be generating a geofence in an area which has reportedly had certain levels of inaccuracies in detecting vehicle location. The alert may indicate that a larger geofence area may decrease errors or false alerts. The screen 700 may further provide for an indication of a suggested geofence size compared to the originally set geofence size 706. Thus, the user may achieve more desired results and more efficient geofences.

Accordingly, user feedback may be provided to the server 162 to facilitate aggregating of user data by the server 162 to provide for updated geofence data, estimation, and accuracy.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle geofence system, comprising:
  a vehicle location detection device configured to provide vehicle location data for a vehicle;
  a memory configured to maintain geofence data; and
  a processor programmed to:
    receive the vehicle location data,
    compare a vehicle location as indicated by the vehicle location data to the geofence data,
    in response to determining that the vehicle has crossed a geofence, present an inquiry, to a user, requesting feedback as to the accuracy of the geofence crossing,
    receive user feedback to the inquiry, and
    provide the user feedback to a server external of the vehicle, and
    in response to the user feedback indicating an inaccuracy of the geofence crossing, present an alert to the user indicating that a larger geofence area may decrease the inaccuracy.

2. The system of claim 1, wherein the user feedback is received at a vehicle display.

3. The system of claim 1, where the inquiry is displayed on a vehicle display and includes at least two response options, one option indicating an accurate geofence crossing and the another option indicating an inaccurate geofence crossing.

4. The system of claim 1, where the inquiry is displayed on a mobile device associated with the user and includes at least two response options.

5. The system of claim 1, where the inquiry is an audible inquiry emitted from at least one vehicle speaker.

6. The system of claim 1, wherein the user feedback is received at a vehicle microphone.

7. The system of claim 1, wherein the vehicle location detection device is at least one of a global positioning system (GPS) device and a global system for mobile communications (GSM) device.

8. The system of claim 1, wherein the vehicle location data includes a 3D estimation error to determine the vehicle location.

9. A method for a vehicle geofence system, comprising:
  receiving vehicle location data for a vehicle;
  comparing a vehicle location as indicated by the vehicle location data to geofence data stored in a memory;
  generating, in response to determining that the vehicle has crossed a geofence, an audible inquiry via a vehicle speaker, to a user, requesting feedback as to the accuracy of the geofence crossing;
  receiving user feedback to the inquiry via a vehicle microphone; and
  providing the user feedback to a server external of the vehicle.

10. The method of claim 9, wherein the user feedback is received at a vehicle display.

11. The method of claim 9, where the inquiry is further presented by being displayed on a mobile device associated with the user and includes at least two response options.

12. The method of claim 9, wherein the vehicle location data is acquired from at least one of a global positioning system (GPS) device and a global system for mobile communications (GSM) device.

13. The method of claim 9, wherein the vehicle location data includes a 3D estimation error to determine the vehicle location.

14. A vehicle geofence system, comprising:
a vehicle location detection device configured to provide vehicle location data for a vehicle, wherein the vehicle location data includes a 3D estimation error to determine a vehicle location;
a memory configured to maintain geofence data,
a vehicle display configured to present information and receive user feedback; and
a processor programmed to:
  in response to determining that the vehicle has crossed a geofence based on the location data, instruct the display to present an inquiry regarding the accuracy of the geofence crossing,
  receive, at the display, the user feedback to the inquiry, and
  provide the user feedback to a server external of the vehicle.

15. The system of claim 14, where the inquiry includes at least on question and at least two response options.

16. The system of claim 14, wherein the vehicle location detection device is at least one of a global positioning system (GPS) device and a global system for mobile communications (GSM) device.

\* \* \* \* \*